United States Patent
Forrest et al.

(10) Patent No.: US 9,659,465 B2
(45) Date of Patent: May 23, 2017

(54) PROBLEM RESOLUTION VALIDATION

(71) Applicant: NCR Corporation, Duluth, GA (US)

(72) Inventors: Simon J. Forrest, Dundee (GB); Michael James Neilan, Dundee (GB)

(73) Assignee: NCR Corporation, Duluth, GA (US)

(*) Notice: Subject to any disclaimer, the term of this patent is extended or adjusted under 35 U.S.C. 154(b) by 0 days.

(21) Appl. No.: 14/136,971

(22) Filed: Dec. 20, 2013

(65) Prior Publication Data
US 2015/0180728 A1 Jun. 25, 2015

(51) Int. Cl.
G06F 15/173 (2006.01)
G06F 15/16 (2006.01)
G07F 19/00 (2006.01)
H04L 12/24 (2006.01)

(52) U.S. Cl.
CPC ........ G07F 19/209 (2013.01); H04L 41/0883 (2013.01); H04L 41/5074 (2013.01); H04L 41/046 (2013.01)

(58) Field of Classification Search
USPC ........................................................ 709/217
See application file for complete search history.

(56) References Cited

U.S. PATENT DOCUMENTS

| | | | |
|---|---|---|---|
| 2004/0149819 A1* | 8/2004 | Shepley | G07F 19/20 235/379 |
| 2006/0078859 A1* | 4/2006 | Mullin | G03G 15/5016 434/219 |
| 2006/0233313 A1* | 10/2006 | Adams et al. | 379/21 |
| 2009/0199053 A1* | 8/2009 | Neilan et al. | 714/57 |
| 2010/0097940 A1* | 4/2010 | Asefa et al. | 370/245 |
| 2010/0256865 A1* | 10/2010 | Ying | 701/33 |
| 2013/0103973 A1* | 4/2013 | Werth et al. | 714/2 |
| 2014/0222378 A1* | 8/2014 | Piety et al. | 702/183 |

* cited by examiner

Primary Examiner — Karen Tang
(74) Attorney, Agent, or Firm — Schwegman, Lundberg & Woessner

(57) ABSTRACT

A method of validating resolution of a problem at a media terminal is described. The method comprises accessing a file including a task; identifying a plurality of specific actions to be taken to perform the task; and ascertaining each event that would be triggered by the media terminal when each identified specific action is performed correctly. The method further comprises: displaying the identified specific actions to a service engineer; and transmitting a validation message to a remote management system when all ascertained events have been triggered in response to the service engineer performing the identified specific actions correctly.

12 Claims, 5 Drawing Sheets

PROBLEM RESOLUTION VALIDATION

FIELD OF INVENTION

The present invention relates to problem resolution validation. In particular, although not exclusively, the invention relates to automated validation of problems resolved at a media terminal such as a self-service terminal (SST). The problems may be resolved either by the media terminal itself or by a service engineer.

BACKGROUND OF INVENTION

SSTs, such as automated teller machines (ATMs), require servicing so that they remain in operation. ATMs require servicing to prevent and correct faults and also to replenish media that is being dispensed at the ATM. This media includes banknotes and printer paper.

When a service engineer corrects a problem (for example, a fault or insufficient media), he or she contacts a central management system to report that the problem has been corrected. However, there is no automated mechanism available for the central management system to validate that the problem has been (or all of the problems have been) resolved by the service engineer. In some cases, when the service engineer leaves the ATM, the ATM is still not functioning correctly; however, a fault may not be generated by that ATM until the first transaction after the service engineer has left the ATM. By this time the service engineer may be a significant distance from that ATM.

Furthermore, it is particularly important that when an ATM is out of service a service engineer is able to resolve any problems and restore the ATM to full operation. However, a service engineer may not have all the required information to successfully repair a faulty ATM.

SUMMARY OF INVENTION

Accordingly, the invention generally provides methods, systems, apparatus, and software for automatically validating problem resolution.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of validating resolution of a problem at a media terminal, the method comprising: accessing a file including a task; identifying a plurality of specific actions to be taken to perform the task; ascertaining each event that would be triggered by the media terminal when each identified specific action is performed correctly; displaying the identified specific actions to a service engineer; and transmitting a validation message to a remote management system when all ascertained events have been triggered in response to the service engineer performing the identified specific actions.

The step of accessing a file may include receiving the file from a remote management application.

The file including a task (the "task file") may include: the specific actions to be performed (including the order in which those specific actions should be performed) to resolve the problem. The task file may also include a description of the event that would be triggered when each specific action is performed.

The task file may be generated by the remote management system. This may be implemented by accessing a look-up table that maps (a) each event notification associated with a problem, to (b) one or more specific actions required to correct that problem, and (c) one or more events that would be triggered when the problem is corrected.

Alternatively, the task file may be generated by the remote management system by accessing a data store (such as an Enterprise Data Warehouse) that stores previous known resolutions to problems. Data mining techniques may be used to extract the required specific actions from the data store. Any new resolutions to problems may be added to the data store.

Alternatively, the task file may only include an indication of the problem. Where the task file only indicates the problem, the media terminal (for example, as part of a management agent) may include an inference engine that is operable to identify the specific actions required to resolve the problem and to ascertain the event that would be triggered when each of the specific actions is performed.

The task file may include a plurality of tasks. Each task may relate to one device; for example, a first task may relate to clearing a jam in a cash dispenser, a second task may relate to replenishing a receipt printer with paper.

The step of receiving the task file may be implemented by a management agent executing on the media terminal. The management agent may receive the task file as an xml or text file (formatted or unformatted), a PDF file, a file having video components, or any other convenient format of file.

The step of displaying the identified specific actions to a service engineer may comprise displaying a first identified specific action to the service engineer. The method may comprise the further steps, after the step of displaying the first identified specific action, of: detecting an event corresponding to an ascertained event associated with the first identified specific action; and displaying a next identified specific action. The method may prevent display of the next specific action until an event associated with the current specific action has been detected.

The method may comprise the further step, prior to the transmitting step, of detecting an event corresponding to an ascertained event associated with a last identified specific action.

The method may comprise the further steps of: detecting absence of an ascertained event or presence of an event that should not be triggered in response to the specific action being performed; and transmitting a request for an updated task in response to the detecting absence or presence step.

The method may comprise the further step of providing feedback to a service engineer each time a correct event has been detected in response to the service engineer performing a specific action. The feedback may be in the form of presenting to the service engineer the next specific action to be performed or informing the service engineer that all required specific actions have been performed.

The step of requesting an updated task file has the advantage of making the problem resolution process dynamic in that any errors detected in resolving a fault could be transmitted to the remote management system so that an updated task file could be received to ensure that the faults are corrected.

The method may include the further step of receiving a request from the remote management server (which may have been triggered by the data store) for additional information to be collected at the ATM. This additional information may be used by the remote management server to create the updated task file.

The method may comprise the further step of registering with an agent core in the media terminal to receive events triggered by devices within the media terminal.

The validation message may include a list of the identified specific actions that were performed by the service engineer and a list of the events that were triggered by the media terminal in response to the service engineer performing the specific actions.

It should now be appreciated that this aspect has the advantages of providing real-time feedback to the remote management system on the steps being performed by the media terminal, thereby allowing automated validation of a service call to a media terminal. It also generates the feedback automatically which removes the requirement for manual entry of the resolution by the service engineer. This simplifies task completion paperwork and reduces manual logging of issues by the service engineer. This saves the service engineer time allowing him/her to move onto the next service call, it also enables standard issue resolution information to be provided to the remote management system, removing potential errors in service engineers manually reporting issue resolution.

By virtue of this aspect a task file is provided that can be automatically processed at the media terminal to provide the required steps for a service engineer to correct a fault or otherwise restore a media terminal to full operation. The media terminal monitors changes in status, or other changes that trigger events, within the media terminal to ensure that the service engineer has correctly performed the required steps.

According to a second aspect there is provided a media terminal comprising: a management agent executing on the terminal and being operable to: (i) receive a task list from a remote management system, (ii) derive from the task list a plurality of specific actions to be performed in sequence, and (iii) identify, for each specific action, an event that would be triggered by the media terminal when that specific action is performed correctly; and a display operable to: (i) display each specific action to a service engineer in sequence, with a next specific action only being displayed in response to an event associated with that specific action being detected.

The display may be controlled by the management agent either directly or indirectly. For example, indirect control may be implemented via supervisor application or via a system application operable to provide diagnostic and servicing functions.

The management agent may be further operable to transmit a validation message to the remote management system when all ascertained events have been triggered in response to the service engineer performing the specific actions.

The management agent may comprise: an agent core, a plurality of collector components, and a transfer service.

One of the collector components may comprise a problem validation collector component. The problem validation collector component may register with the agent core to receive events triggered by any device within the media terminal.

The agent core may comprise: an agent configuration component; a rules engine component; a scheduling component; and an event filtering component. The agent core may temporarily reconfigure any rules (in the rules engine component) that suppress creation or transmission of an event, for example, while the media terminal is in a maintenance (or non-transaction) mode, so that all events are provided to the problem validation collector component when the service engineer is operating on the media terminal.

The scheduling component may include details (programmed using the agent configuration component) about when information should be retrieved from the collectors associated with the managed devices and/or transmitted to the remote management application.

The transfer service component may be used to facilitate communications between the remote management application and the agent core.

The transfer service component may implement a known communications technology. For example, the transfer service may implement simple network management protocol (SNMP), Web services, a Background Intelligent Transfer Service (BITS), or the like.

The transfer service component may be operable to assign a unique sequence number and a time to each event that is transmitted to the remote management application.

The media terminal may comprise an automated teller machine, a self-checkout terminal, a payment terminal, a teller terminal, an assisted self-service terminal, or the like.

According to a third aspect there is provided a management agent for executing on a media terminal and being operable to: (i) receive a file including a task; (ii) derive a plurality of specific actions to be taken to perform the task; (iii) ascertain each event that would be triggered by the media terminal when each specific action is performed correctly; (iv) provide a presentation client with details of the specific actions; (vi) detect events triggered by the media terminal; and (vii) transmit a validation message to the remote management system when all ascertained events have been detected in response to the service engineer performing those specific actions.

According to a fourth aspect there is provided a system comprising a media terminal according to the second aspect and a remote management application.

According to a fifth aspect there is provided a management application operable to: (i) receive a service event from a media terminal, (ii) create a file for that media terminal, where the file includes a task to be performed to resolve a problem that triggered the service event; (iii) transmit the file to that media terminal; and (iv) close the service event in response to receipt of a validation message from the media terminal.

The management application may be further operable to: populate the created file with: a list of specific actions to be performed to resolve the problem, and a list of events that would be triggered by the media terminal when each specific action is performed correctly.

The media terminal may comprise an automated teller machine.

According to a sixth aspect there is provided a method of validating resolution of a problem at a media terminal, the method comprising: receiving a task list from a remote management system; identifying a plurality of individual tasks from the task list; ascertaining a specific action to be taken to perform each identified task; ascertaining each event that would be triggered by the media terminal when the ascertained specific action is performed correctly; displaying the specific actions to a service engineer; and transmitting a validation message to the remote management system when all ascertained events have been triggered in response to the service engineer performing those specific actions.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
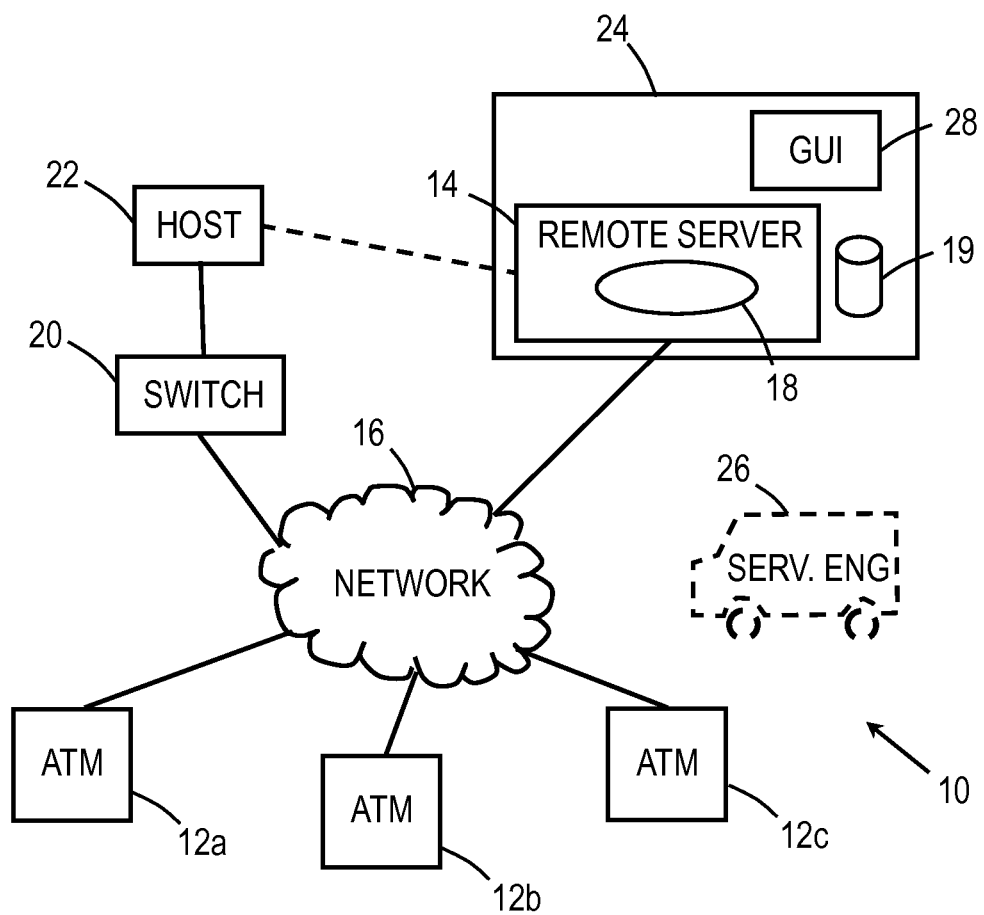
FIG. 1 is a simplified block diagram illustrating a system for automated validation of problem resolution at a media terminal according to one embodiment of the present invention.

Reference is first made to FIG. 1, which is a block diagram illustrating a system 10 for providing a notification about an event relating to a service operation according to one embodiment of the present invention.

The system 10 comprises a plurality of media terminals 12 (only three of which are illustrated in FIG. 1) in the form of automated teller machines (ATMs) coupled to a remote management server 14 by an Internet Protocol (IP) network 16. A management application 18 executes on the remote management server 14 and is used to monitor the status and performance of the ATMs 12 in the system 10, and to schedule maintenance and replenishment operations for the ATMs 12.

The remote management application 18 is connected to a data store 19 that contains information about the ATMs 12. In this embodiment, the data store is in the form of an Enterprise Data Warehouse (EDW) that stores historical problem information, associated problem resolution information, and event (including status) information associated with specific actions (such as remedial operations) that can be taken to resolve the problems. The EDW may be populated with information obtained from many different networks of ATMs so that it provides a large repository of ATM fault and resolution information.

The system 10 also comprises a conventional transaction switch 20 and an authorization server 22. As is known in the art, the transaction switch 20 is used to route transactions requested by a customer at one of the ATMs to a financial institution that maintains an account for that customer. For any transactions requested by customers of the owner of the system 10 (referred to as "on-us" transactions), the authorization server 22 provides the authorization approval or denial. For other transactions ("not-on-us" transactions) the transaction switch 20 routes the transaction request to an appropriate interchange network for approval. In this embodiment, the transaction switch 20 and the authorization server 22 are conventional, unmodified, devices similar to those currently used in conventional ATM networks.

The remote management server 14 is located within a call center 24 that dispatches a service engineer 26 to maintain and repair the ATMs 12 in the system 10. The call center 24 includes computers (not shown) for use by the call center staff and each staff member is provided with a graphical user interface (GUI) 28 for monitoring the status of the ATMs 12.

Figure 2:
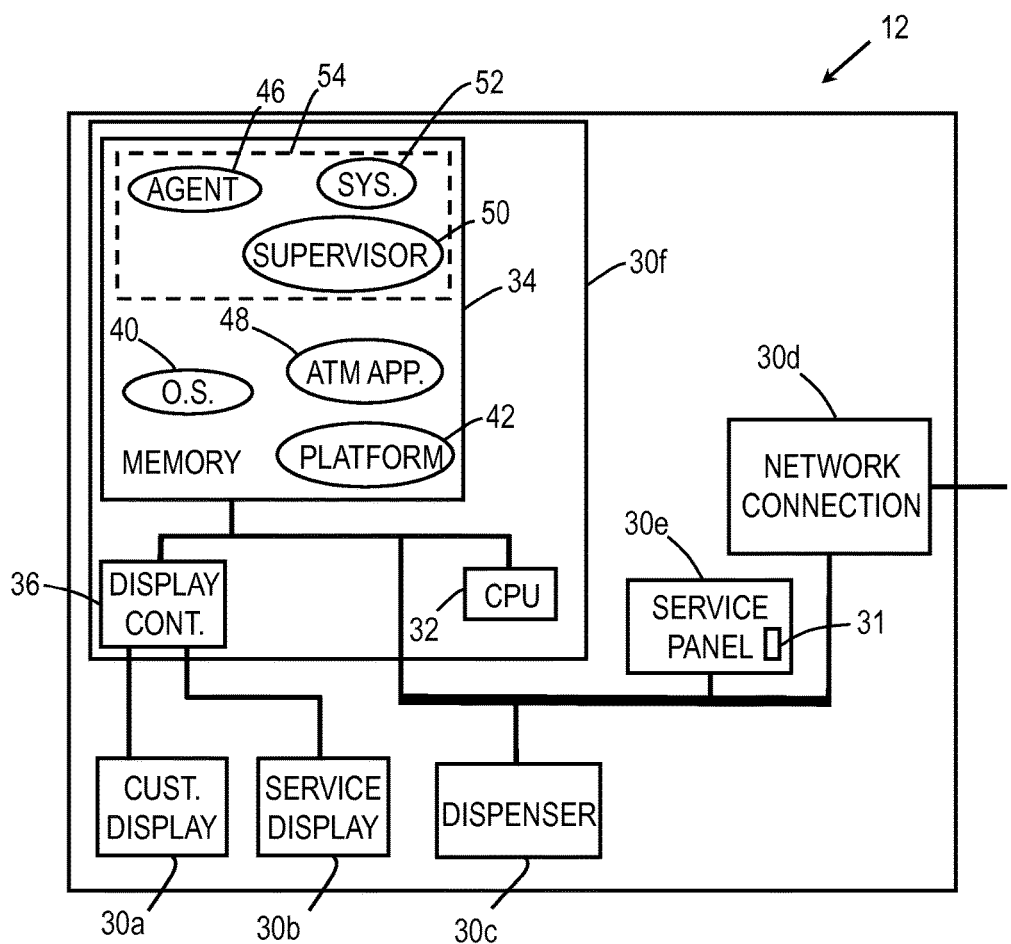
FIG. 2 is a simplified block diagram illustrating a media terminal (an ATM) of the system of FIG. 1 in more detail.

Reference is now also made to FIG. 2, which is a simplified block diagram illustrating one of the ATMs 12 of FIG. 1 in more detail.

Each ATM 12 includes a plurality of managed devices 30. As used herein, the term "managed device" has a broad meaning that encompasses software components, hardware components, and combined software and hardware components.

The managed devices include, inter alia, a customer display 30a, a service operator display 30b; a cash dispenser device 30c; a network device 30d for connecting to the IP network 16; a service panel 30e, and a controller device 30f (in the form of a PC core) for controlling the operation of the ATM 12, including the operation of other managed devices (not shown for simplicity of description).

The service panel 30e is used by a service engineer, a replenisher, and sometimes branch staff who are clearing paper jams. The service panel 30e includes a physical mode switch 31 (which in some embodiments may be a software switch or a logical switch, for example, provided on a touch-sensitive panel) that switches the ATM 12 between transaction mode and service mode, as described in more detail below.

The controller 30f comprises a microprocessor 32, associated main memory 34, and a display controller 36 in the form of a graphics card that controls both the customer display 30a and the service operator display 30b (in some embodiments a single display may serve as both the customer display and the service operator display).

During operation of the ATM 12, various software components are loaded into, and execute in, the memory 34. These components include a conventional operating system 40 (in this embodiment a Microsoft (trade mark) Windows 7 (trade mark) operating system), platform components 42 for enhancing and extending the operating system for non-standard devices (such as the cash dispenser 30c, and the like), a distributed management agent 46, an ATM transaction application 48, a supervisor application 50, and a system application 52 accessible from (or incorporated into) the supervisor application 50.

The ATM 12 implements the CEN XFS standard so the ATM application 48 issues XFS format commands and requests. As is known in the art, CEN is the European Committee for Standardization, and XFS is the eXtensions for Financial Services standard.

To implement the XFS standard, the platform components 42 include an XFS manager (not shown in FIG. 2) and XFS service providers (not shown separately) associated with various managed devices 30 within the ATM 12. For example, there is an XFS service provider associated with the cash dispenser device 30c (or more accurately, associated with software associated with the cash dispenser device 30c, such as driver software and/or feature software). As is known in the art, the driver software implements the low-level commands to control the device in response to standard CEN commands received (from the ATM transaction application 48 or the supervisor application 50) via the XFS service provider for that device.

As is known in the art, the ATM application 48 controls the operation of the ATM 12 to allow customers to execute transactions. In this embodiment, the ATM application 48 is a conventional (unmodified) XFS-compliant ATM application.

The supervisor application 50 is operable to allow an authorized user to configure and service the ATM 12 (including maintaining the ATM 12, diagnosing faults in the ATM 12, and replenishing the ATM 12). The supervisor application 50 also uses the XFS standard to communicate with managed devices 30 within the ATM 12, and also communicates with the management agent 46.

The system application 52 is operable to facilitate access to diagnostic information (which may be vendor-dependent and may be accessed by non-XFS commands) and to provide servicing functions (such as performing self-tests on devices installed in the ATM 12) to an authorized person. An example of a suitable system application may be the "Sys-App" application, available from NCR Corporation. Another suitable application may be "Branch Aid" software, also available from NCR Corporation.

The combination of the management agent 46, the supervisor application 50, and the system application 52 comprises a local application 54 (shown in broken line in FIG. 2).

Figure 3:
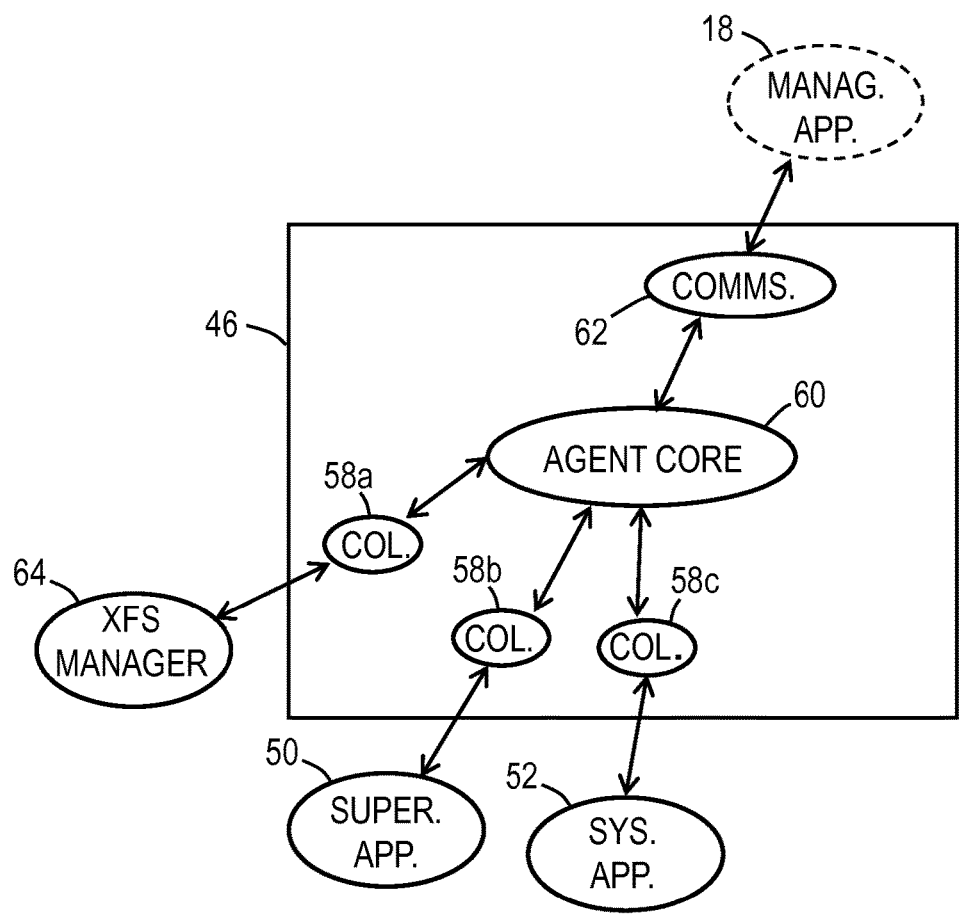
FIG. 3 is a simplified block diagram illustrating software components executing in a memory of the ATM of FIG. 2.

Reference will now also be made to FIG. 3, which is a simplified block diagram illustrating in more detail some of the software components executing in the memory 34 during operation of the ATM 12, particularly the management agent 46.

The management agent 46 includes various collector components 58 (only three of which are shown). The management agent 46 also comprises an agent core 60 that communicates with all of the collector components 58, and a transfer service component 62 that manages communication between the agent core 60 and the remote management application 18 (shown in broken line in FIG. 3 because it does not execute on the ATM 12).

Each collector component 58 is associated with at least one (but in some cases multiple) managed device(s) 30. One of the collector components 58a (an XFS collector component) is associated with an XFS manager 64 (as will be explained in more detail below). Another of the collector components 58b (a supervisor collector component) is associated with the supervisor application 50 (as will be explained in more detail below). Yet another collector component 58c (a problem validation collector component) is associated with the system application 52. Various other collector components are also present but are not illustrated in FIG. 3 because they are not essential to an understanding of this embodiment.

The XFS collector component 58a communicates with the XFS manager 64 and the XFS service providers associated with the various managed devices 30 within the ATM 12. This enables the XFS collector component 58a to gather information from the relevant service providers, either by sending a request when the information is needed, or by sending requests according to a defined schedule (typically stored by the agent core 60).

As will be described in more detail below, the problem validation collector component 58c communicates with the remote management application 18 to receive a task file, and also communicates with the display controller 36 (either directly or via the supervisor application 50 or the system application 52) to provide information to be presented on the service display 30b. A service engineer uses this information to perform specific actions as listed on the service display 30b. The problem validation collector component 58c also registers with the agent core 60 to receive events triggered by managed devices 30 within the ATM 12.

The management agent 46 also includes a transfer service component 62 that manages communication between the agent core 60 and the management application 18 (FIG. 1). The transfer service component 62 assigns a unique sequence number to each event that is transmitted to the management application 18. Each event typically includes: details of the device that triggered the event (for example, the cash dispenser 30c), details of the event itself (for example, a paper jam, a banknote jam, a print head error, or the like), details of the management agent that transmitted the event, and details of the ATM that experienced the event (for example, a serial number of the ATM, an IP address of the ATM, and the like). Details of the event also includes: the status of any sensors on the device that are relevant to the fault.

The combination of the agent core 60, the various collector components 58, and the transfer service component 62 comprise the management agent 46.

Figure 4:
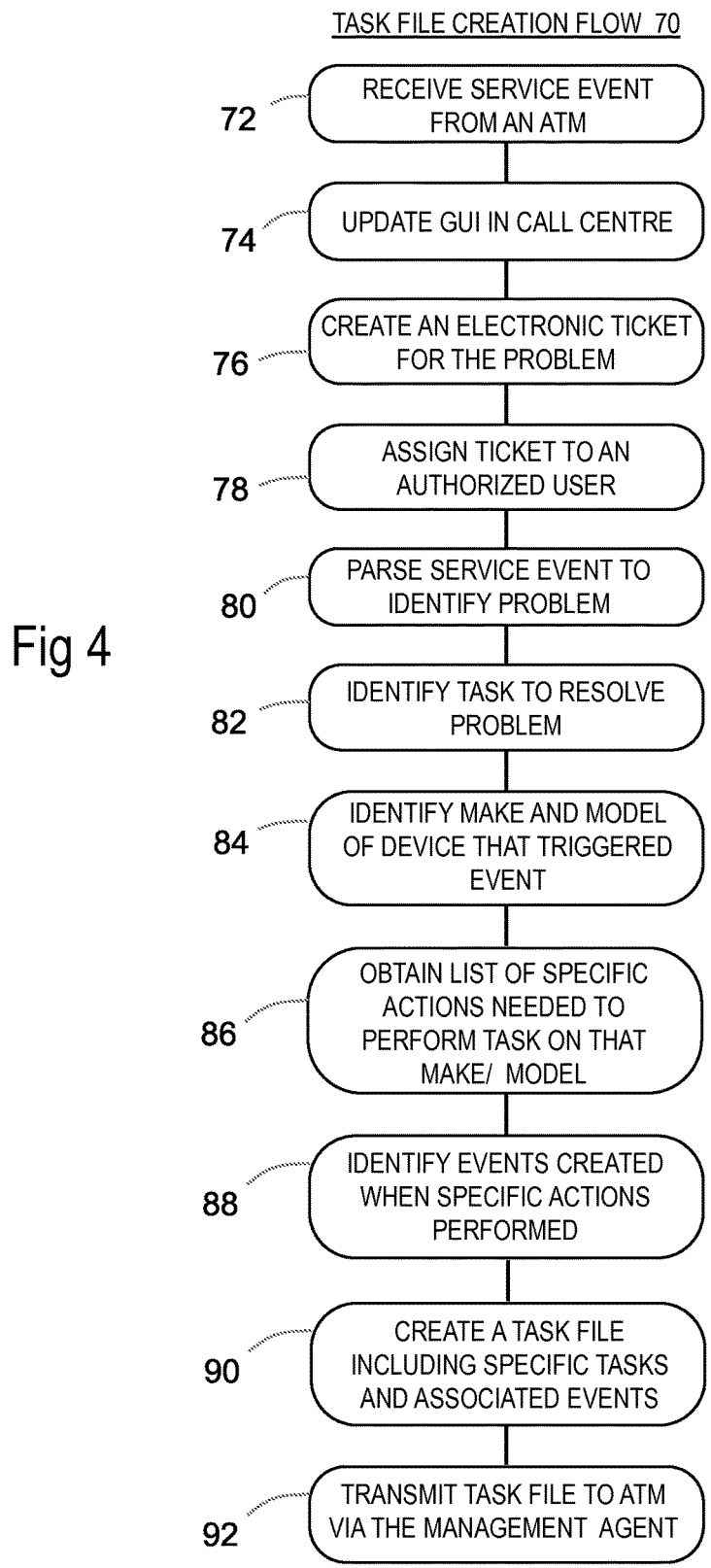
FIG. 4 is a flowchart illustrating steps performed at a remote management application of the system of FIG. 1 when a service event is received from the ATM of FIG. 2.

FIG. 4 is a flowchart 70 illustrating steps performed at the remote management application 18 when a service event (that is, an event indicating that some repair, replenishment, or maintenance operation is required) is received from the ATM 12.

If the ATM 12 develops a problem, then the managed device 30 that experiences the problem creates a service event that is detected by the appropriate collector component 58. The agent core 60 handles this event and forwards it, via the transfer service component 62, to the remote application 18.

The remote application 18 receives this service event (step 72), updates the GUI 28 to indicate that a fault has been detected at the ATM 12 (for example, by adding a red dot or cross on or near the graphical representation of the ATM 12) (step 74), and creates an electronic "ticket" for that fault (step 76).

The remote application 18 assigns the fault (the ticket) to an authorized user within the call center 24 (step 78), which they can see represented on the GUI 28 beside a representation of the ATM 12 experiencing the fault. The authorized user can then dispatch a service engineer to correct the fault by issuing a dispatch notice. The dispatch notice to the service engineer indicates the type and location of the ATM 12 and the type of fault that was detected by the ATM 12.

The remote management application 18 then parses the service event (step 80) to ascertain the nature of the problem (for example, a jam in the cash dispenser 30c), which is typically provided by a unique problem code.

When the nature of the problem is known, the remote management application 18 then identifies the task to be performed (for example, removing the jammed banknote) (step 82).

Identifying the task to be performed is usually straightforward and can be deduced from the nature of the problem. For example, if the problem is print head failure then the task is to replace the print head.

Once the task has been identified, the remote management application 18 interrogates the EDW 19 to identify the make and model of device that triggered the event (step 84). The EDW 19 stores the configuration information for all of the ATMs 12, which includes details of the make and model of each device 30 in each of the ATMs 12. The EDW also stores historical problem information for a large number of ATMs by make/model of device that experienced those problems.

Once the make and model of the device is known, the remote management application 18 can then interrogate the EDW 19 to obtain the list of specific actions needed to perform the task (step 86). For example, if the service event relates to a printer being low on paper, then the specific actions may comprise: rack out printer, open printer, remove printer roll, insert new printer roll, close printer, rack printer back in, initiate printer self-test. However, one model of printer may have a printer blade that needs to be retraced prior to removing the printer roll, so the specific actions for that printer model would be: rack out printer, open printer, retract printer blade, remove printer roll, insert new printer roll, replace printer blade, close printer, rack printer back in, initiate printer self-test.

For each specific action for a particular make/model of device, the EDW 19 stores any associated event that would be generated by that specific action. The remote management application 18 obtains these events from the EDW 19 (step 88). For example, if a banknote is jammed in the cash dispenser 30c then a sensor within the cash dispenser 30c may have a blocked status. Once the jam has been cleared, the status of the sensor should change to clear, and an event should be generated by the cash dispenser 30c to indicate this change of status.

The remote management application 18 then creates a task file that includes the task to be performed, the specific actions to be taken, and the events that are expected to be generated (step 90). It should be appreciated that one ATM 12 may generate multiple service events in a short space of time, so the task file may comprise multiple tasks, each with its own set of specific actions and associated events. If there is a desirable order in which the tasks should be performed then the remote management application 18 includes the tasks in the desired order in the task file.

The remote management application 18 then transmits the created task file to the management agent 46 on the ATM 12 that triggered the service event (step 92). More specifically, the remote management application 18 transmits the task file to the transfer service component 62, which conveys the task file to the problem validation collector component 58c.

Thus, at this point in time, a service engineer has been dispatched to the ATM 12 to resolve the problem, and the remote management application 18 has transmitted a file to the ATM 12 to provide the service engineer with guidance on how to resolve the problem. The file may comprise a text file, or advantageously an XML format file to allow simple parsing by the management agent 46.

Figure 5:
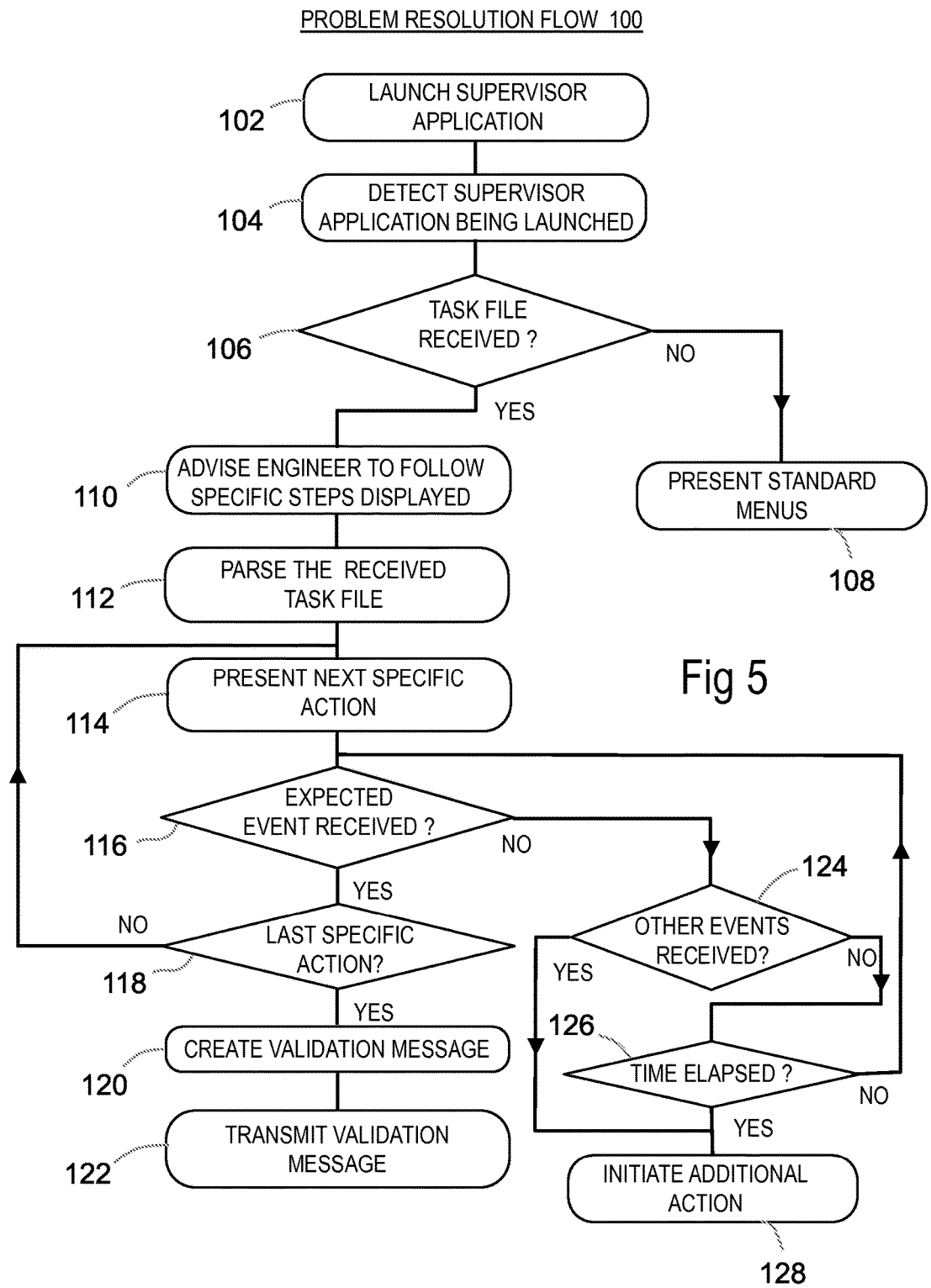
FIG. 5 is a flowchart illustrating steps performed by the ATM of FIG. 2 in response to a task file received from the remote management application of the system of FIG. 1.

Resolution of the problem at the ATM 12 will now be described with reference to FIG. 5, which is a flowchart 100 that illustrates steps performed by the ATM 12 in response to receipt of a task file from the remote management application 18 and operations performed by the service engineer.

When the service engineer arrives, he or she opens up an access door (not shown) of the ATM 12 and presses the physical mode switch 31 (or software switch) to change the ATM 12 from transaction mode (in which the ATM transaction application 48 controls the ATM 12) to service mode (in which the supervisor application 50 controls the ATM 12). This causes the supervisor application 50 to launch (step 102). The management agent 46 detects this (that is, launching of the supervisor application) (step 104) and checks if a task file has been received from the remote management application 18 (step 106).

If no task file has been received by the management agent 46 then the supervisor application 50 presents a conventional menu to the service engineer (step 108) and the service engineer repairs, replenishes, or maintains the ATM 12 in a conventional manner.

If a task file has been received by the management agent 46 then the management agent 46 (in particular, the problem validation collector component 58c) presents information on the service display 30b informing the service engineer that he/she should follow the steps to be presented on the service display (step 110).

The problem validation collector component 58c parses the task file to extract problem-related information (step 112). The problem-related information comprises the specific actions to be performed to correct the problem, which includes the order in which those specific actions should be performed. The task file may also include a description of the event that would be triggered when each specific action is performed.

It should be appreciated that steps 110 and 112 may be performed simultaneously or in the reverse order to that described above.

The problem validation collector component 58c then presents the next (which at this stage is the first) specific action from the task list to the service engineer using the service display 30c (step 114).

The problem validation collector component 58c then monitors for the associated event (step 116). The problem validation collector component 58c registers with the agent core 60 to receive events. For example, if the task file includes a task relating to replenishing paper in a receipt printer, then the first specific action may be to rack out the receipt printer (or a tray on which the receipt printer is mounted). When the service engineer performs this specific action, a sensor associated with the receipt printer (or receipt printer tray) may trigger an event indicating that a sensor used to detect when the receipt printer is racked in has changed state. This would be the event that is associated with that specific action.

If the associated event is detected then the problem validation collector component 58c ascertains if there are more specific actions for the service engineer to perform (step 118). If there are more specific actions to perform then steps 114 to 118 are performed until all specific actions have been completed. When this occurs the problem validation collector component 58c creates a validation message (step 120).

The validation message comprises a list of the specific actions performed by the service engineer, the associated events that were triggered when the specific actions were performed, any unexpected events that were triggered while the service engineer was operating on the ATM 12, and optionally other information (such as an indication of the identity of the service engineer).

The problem validation collector component 58c then transmits the validation message to the remote management application 18 via the transfer service component 62 (step 122).

Returning to step 116, if the associated event is not detected, then another event may be detected (step 124).

If another event is not detected, and the time limit for performing the operation (set by the task file or by the problem validation collector component 58c) (step 126) has not elapsed then the problem validation collector component 58c waits for the associated event (in effect, the process returns to step 116).

If another event is detected (not the associated event) (the "unexpected event"), then the problem validation collector component 58c initiates additional action (step 128). In this embodiment, the additional action involves the problem validation collector component 58c sending the unexpected event to the remote management application 18 and waiting for an updated task file comprising a new set of specific actions to be performed or an instruction to ignore the unexpected event and to continue with the specific actions in the current task file.

It should now be appreciated that this embodiment has the advantage that a service engineer is guided through a sequence of actions, one action at a time, and the ATM 12 validates that the service engineer has performed the action before moving to the next action. This greatly increases the probability that the problem reported by the ATM 12 will be resolved by the service engineer.

Although some software described herein is referred to as a component, and other software may be referred to as a function, it should be appreciated that such software may be implemented in any convenient form, including as routines, objects, methods, procedures, libraries, or the like, and references in these embodiments to software as components is not intended to restrict the embodiments to any particular form of code.

Various modifications may be made to the above described embodiment within the scope of the invention, for example, in other embodiments, self-service terminals other than ATMs, or networks other than SSTs, may be used to implement the event handling function.

In other embodiments, the system 10 may not implement the CEN XFS standard; proprietary commands may be used instead. In other embodiments, such as embodiments in a retail environment, the OPOS standard may be used.

For simplicity of description only three collectors 58 are described above, but in other embodiments additional, or different, collectors may be used, such as an SNMP collector, a software distribution collector, a file document collector (for collecting information from third party devices that output information in a file format, such as XML), and the like.

In other embodiments, the management application 18 may execute on the authorization server 22 instead of on the remote management server 14 (there may be no remote management server 14).

In other embodiments, a single display may function as both the customer display and the service operator display.

In other embodiments, different visual representations of the status of a media terminal may be provided than those described above. For example, instead of colored dots, crosses, or ticks, the entire ATM may be rendered on the GUI 28 in a color indicating the status of that ATM (for example, red for out of service, amber for running low on media, green for operational and not running out of media).

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of validating resolution of a problem at a media dispensing terminal requiring dispatch of an on-site service engineer, the method comprising:

accessing, by the media dispensing terminal, a file including a task having event descriptions for events associated with the task;

identifying, by the media dispensing terminal, a plurality of specific actions to be taken by the on-site service engineer to perform the task;

ascertaining, by the media dispensing terminal, each event that would be triggered by the media dispensing terminal when each identified specific action is performed correctly;

displaying, by the media dispensing terminal, the identified specific actions to the service engineer one identified specific action at a time;

determining, by the media dispensing terminal, following performance of each of the one identified specific actions that a corresponding ascertained event was triggered indicative of each of the one identified specific actions being performed correctly;

communicating, by the media dispensing terminal, with a remote management system for one of: obtaining i) updates to the specific actions, or 2) an instruction to ignore when an unexpected event is detected for a particular action that was performed on the media dispensing terminal and performing updated specific actions on the media dispensing terminal when the updates are obtained from the remote management system and ignoring the unexpected event on the media dispensing terminal when the instruction to ignore is obtained from the remote management system indicating that that action was performed incorrectly;

informing, by the media dispensing terminal, the on-site service engineer that all the identified specific actions have been performed correctly; and transmitting, by the media dispensing terminal, a validation message to the remote management system informing the remote management system that the media dispensing terminal has been properly serviced based on all the identified actions being performed correctly.

2. A method according to claim 1, wherein the step of accessing a file including a task includes receiving a file from a remote management application.

3. A method according to claim 2 wherein the step of receiving the file includes receiving a file populated with a plurality of specific actions and events that would be triggered when the plurality of specific actions are performed correctly.

4. A method according to claim 3 wherein the step of identifying a plurality of specific actions to be taken to perform the task comprises reading the plurality of specific actions from the file; and wherein the step of ascertaining each event that would be triggered by the media dispensing terminal when each identified specific action is performed correctly comprises reading the events from the file.

5. A method according to claim 1, wherein the method comprises the further steps of:

using an inference engine to ascertain from a task provided in the file a plurality of specific actions and events that would be triggered when the plurality of specific actions are performed correctly.

6. A method according to claim 1, wherein the file includes a plurality of tasks, each task relating to a device in the media dispensing terminal.

7. A method according to claim 1, wherein the method comprises the further step, prior to the transmitting step, of detecting an event corresponding to an ascertained event associated with a last identified specific action.

8. A method according to claim 1, wherein the method comprises the further steps of:

detecting absence of an ascertained event or presence of an event that should not be triggered in response to the specific action being performed; and transmitting a request for an updated task in response to the detecting absence or presence step.

9. A method according to claim 1, wherein the method comprises the further step of providing feedback to the on-site service engineer each time a correct event has been detected in response to the service engineer performing a specific action.

10. A method according to claim 1, wherein the method comprises the further step of receiving a request from the remote management server for additional information to be collected at the media dispensing terminal.

11. A method according to claim 1, wherein the method comprises the further step of registering with an agent core in the media dispensing terminal to receive events triggered by devices within the media dispensing terminal.

12. A media dispensing terminal comprising:

a processor configured with a management agent being operable to: (i) receive a task list from a remote management system, the task list including event descriptions for events associated with each task in the task list, (ii) derive from the task list a plurality of specific actions to be performed by an on-site service engineer in sequence one specific action at a time, (iii) identify, for each one specific action, an event that would be triggered by the media dispensing terminal when that one specific action is performed correctly, and (iv) determine following performance of each of the one specific actions that a corresponding ascertained event was triggered indicative of each of the one specific actions being performed correctly; and a display operable to: (i) display each one specific action to the on-site service engineer in sequence, with a next one specific action only being displayed in response to an event associated with that specific action being detected, (ii) inform the on-site service engineer that all the plurality of specific actions have been performed correctly; (iii) contact the remote management system when an unexpected event is received following the processing of an action and obtaining an updated task list in response to the unexpected event and processing an updated action from the updated task list, and (iv) transmit a validation message to the remote management system when all ascertained events have been triggered in response to the service engineer performing the specific actions informing the remote management system that the media dispensing terminal has been properly serviced based on all the identified actions being performed correctly.

* * * * *